No. 870,591. PATENTED NOV. 12, 1907.
D. P. SMALL.
STREET RAILWAY CURVE SWEEPER AND LUBRICATOR.
APPLICATION FILED SEPT. 6, 1907.
FIG. 1
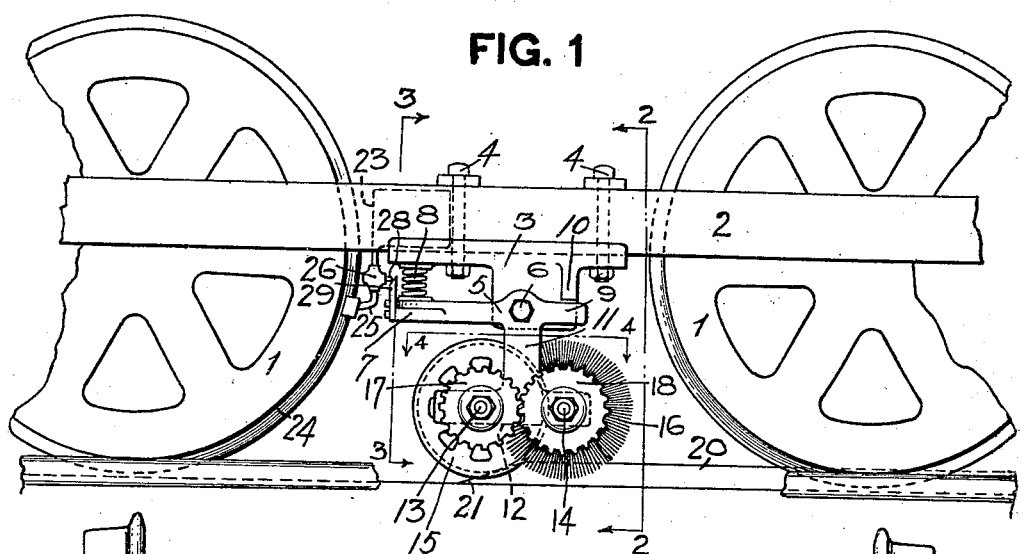
FIG. 3 FIG. 2
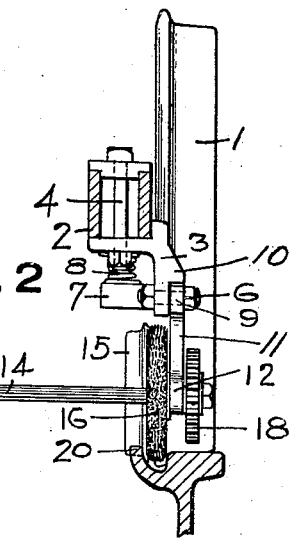
FIG. 4
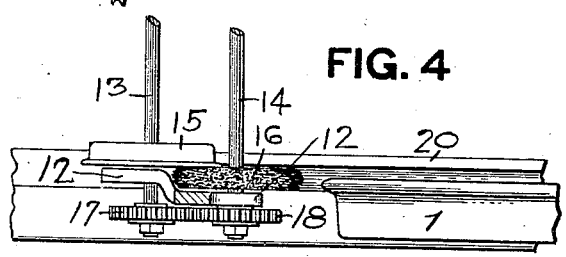
FIG. 5
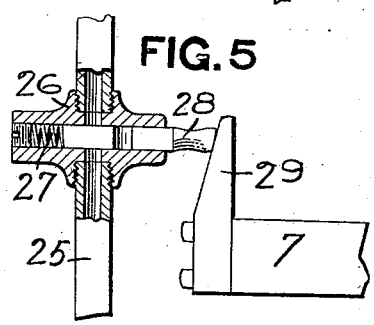
WITNESSES.
J. R. Keller
F. W. Kay
INVENTOR.
David P. Small
By Kay, Totten & Winter
His Attorneys

UNITED STATES PATENT OFFICE.

DAVID P. SMALL, OF MOUNT OLIVER BOROUGH, PENNSYLVANIA.

STREET-RAILWAY CURVE SWEEPER AND LUBRICATOR.

No. 870,591.  Specification of Letters Patent.  Patented Nov. 12, 1907.

Application filed September 6, 1907. Serial No. 391,571.

*To all whom it may concern:*

Be it known that I, DAVID PHILLIP SMALL, a resident of Mount Oliver borough, in the county of Allegheny and State of Pennsylvania, have invented a new and useful Improvement in Street-Railway Curve Sweepers and Lubricators; and I do hereby declare the following to be a full, clear, and exact description thereof.

This invention relates to a device for sweeping and lubricating the grooved rails at curves, crossings and intersections on street railway tracks.

The object of the invention is to provide a device for this purpose which operates entirely automatically so that it needs no attention on the part of the motorman or other parties in charge of the car and one which can be applied to any street car, thereby making it unnecessary to keep special cars for this purpose, but by having one or two cars on each line equipped with the device making it possible to keep the curve rails cleaned out and lubricated.

The invention comprises the construction and arrangement of parts as hereinafter described and claimed.

In the accompanying drawings Figure 1 is a side elevation showing a portion of a car body with my invention applied thereto; Fig. 2 is a cross section on the line 2—2, Fig. 1; Fig. 3 is a similar section on the line 3—3, Fig. 1; Fig. 4 is a plan view of the device, and Fig. 5 is a detail sectional view of the valve.

My invention can be applied either to a car body or to a truck, in case the car is mounted on a truck.

In the drawing the wheels of a car or truck are shown at 1 and a side member of the truck frame or car body indicated at 2.

My device can be adapted to any construction of car body or truck by merely varying the size of the supporting brackets. It is intended to be located, as shown, between the wheels of the car or truck.

The device itself comprises a pair of brackets 3, one on each side of the car, and adapted to be secured to the lower face of the side member 2 of the car body or truck, being secured thereto by means of bolts 4 or other suitable fastening means. These brackets project down toward the track and their size will be varied according to the height of the car part 2 from the track. Pivotally mounted on each bracket is a rocking frame 5, being secured to the bracket by suitable means, such as a bolt 6. This rocking frame is provided with three arms, one arm 7 being arranged to receive the pressure of a compression spring 8 interposed between the same and the car part 2 or portion of bracket 3 and tending to swing said frame on the pivot 6, as will be readily apparent. The oppositely extending arm 9 acts merely to limit the swinging movement of the frame on the pivot 6, being adapted to contact with a suitable stop, such as a lug 10, on the bracket 3. The third arm 11 of the frame projects downwardly toward the track and at its lower end is suitably shaped, such as provided with a cross head 12, to form bearings for two shafts 13 and 14. To the shaft 13 is connected a wheel 15 which may be a small flanged or other wheel adapted to travel on the curve guard rail or flange. To the shaft 14 is secured a suitable brush 16 for sweeping out the rails. The shafts 13 and 14 are geared together so that the rotation of the wheel 15 is imparted to the brush 16, the gearing being shown as comprising two intermeshing spur gears 17 and 18 secured respectively to the shafts 13 and 14, although, if desired, any other form of connecting gearing, such as sprocket wheels and chain, may be employed.

At the curves, crossings and intersections of street railway tracks there is universally used a guard rail or at least a rail having a high guard flange, shown at 20, this rail or flange having sloping ends, as shown at 21. The stop 10 is so positioned that when running on a straight track the frame 5 is held in position to hold the wheel 15 slightly above the face of the rail so that no rotary movement is imparted to the wheel 15 or brush 16. At curves and the like, however, the guard rail or flange 20 is so high that it contacts with the wheel 15 and raises the same considerably, thus rocking the frame 5 against the compression of the spring 8, such rocking movement carrying the brush 16 down into the groove of the rail. The wheel 15 is held by the spring 8 against the guard flange or rail with sufficient force to cause said wheel 15 to rotate and this, through the gearing described, rotates the brush 16 in the opposite direction, causing the latter to sweep out the groove of the rail, as will be readily understood. By varying the relative size of the gears 17 and 18 any necessary or desired speed may be given to the brush 16 so as to effectually sweep out the groove of the rail.

For the purpose of lubricating the curve rail, I employ a suitable oil reservoir, such as shown at 23, arranged to supply the oil to the rail, but preferably to the flange 24 of the rear wheel of the car or truck. The oil is applied to said flange only when passing around curves, this being effected automatically through the rocking frame 5. To effect this the pipe 25 leading from the oil reservoir 23 is provided with a suitable valve 26, normally closed by the spring 27, and having a stem 28 adapted to be actuated by a cam member 29 carried on the arm 7 of the frame 5. Normally the spring 27 keeps the valve 26 closed but when passing around curves the rocking of the frame 5 due to the wheel 15 traveling up on top of the guard rail or flange 20 causes the cam 29 to press on the valve stem 28 and open the valve, thus permitting oil to run down onto the flange of the wheel, the flow being restricted by absorbent waste or pad at the end of the pipe. The oil is applied to the inner face of the flange and by the latter applied to the friction face of the curve rail.

A device of the character described is placed on each side of the car underneath the side members thereof. If desired, the devices on the two sides of the car may be entirely independent but preferably the shafts 13 and 14 are extended from side to side, thus acting as cross braces between the depending frame arms 11. The shafts 13 and 14 are so mounted in their supporting frames as to have a slight endwise movement therein in order to accommodate themselves to the curve of the rails. The flanged wheel 15 necessarily follows along in the groove of the rail, thereby insuring the proper position of said wheel and brush 16 over the curve rail groove. The apparatus described is simple of construction, can be applied to any existing car whether provided with a bogie truck or without a bogie truck and acts automatically to both sweep out grooved rails and also lubricate the same.

What I claim is:

1. In a track sweeper, the combination of a rocking frame adapted to be secured to a truck or car body, a brush rotatably mounted on said frame, a wheel also mounted in said frame adapted to contact with the guard rail or flange and to be raised thereby to rock the frame and lower the brush into the groove of the rail, and gearing connecting said wheel and brush.

2. In a track sweeper, the combination of a rocking frame adapted to be secured to a truck or car body, a brush rotatably mounted in said frame, a wheel mounted in said frame and adapted to contact with the guard rail or flange and be raised thereby to rock the frame and lower the brush into the grooved rail, a spring arranged to rock the frame in the opposite direction from that which it is rocked by the wheel, and gearing connecting the wheel and brush.

3. In a track sweeper and oiler, the combination of a rocking frame adapted to be secured to a car truck or body, a brush rotatably mounted in said frame, a wheel also mounted in the frame and arranged to contact with the guard rail or flange and be raised thereby to rock the frame and lower the brush into the groove of the rail, gearing connecting the wheel and brush, an oil reservoir, a valve controlling an outlet therefrom, and connections between said valve and rocking frame whereby the rocking of the latter opens said valve.

4. In a track sweeper and oiler, the combination of a rocking frame adapted to be secured to a car truck or body, a brush rotatably mounted in said frame, a wheel also mounted in the frame and adapted to contact with a guard rail or flange and be raised thereby to rock the frame and lower the brush into the groove of the rail, a spring arranged to rock said frame in a direction opposite to that in which it is rocked by the wheel, an oil reservoir having an outlet arranged to supply oil to a wheel flange, a valve in said outlet, and connections between the rocking frame and said valve arranged when the frame is rocked by the wheel to open said valve.

5. In a track sweeper, the combination of a rocking frame adapted to be secured to a truck or car body, a brush rotatably mounted in said frame, a wheel mounted in the frame and adapted to contact with the guard rail or flange and be raised thereby to rock the frame and lower the brush into the groove of the rail, a spring arranged to rock the frame in the opposite direction, a stop for limiting the rocking of the frame in the last named direction, and gearing connecting the wheel and brush.

In testimony whereof, I the said DAVID PHILLIP SMALL have hereunto set my hand.

DAVID P. SMALL.

Witnesses:
ROBERT C. TOTTEN,
J. R. KELLER.